(12) United States Patent
Nakano et al.

(10) Patent No.: US 11,458,913 B2
(45) Date of Patent: Oct. 4, 2022

(54) WIRING MODULE INCLUDING A POWER SUPPLY BRANCH PART

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Haruka Nakano, Mie (JP); Shigeki Ikeda, Mie (JP); Daisuke Fukai, Mie (JP); Tetsuya Nishimura, Mie (JP); Motohiro Yokoi, Mie (JP); Housei Mizuno, Mie (JP); Yuichi Nakamura, Mie (JP); Kenta Itou, Mie (JP); Masaki Mizushita, Mie (JP); Susumu Hiei, Mie (JP); Kohei Yamaguchi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 220 days.

(21) Appl. No.: 16/620,659

(22) PCT Filed: Jun. 15, 2017

(86) PCT No.: PCT/JP2017/022055
§ 371 (c)(1),
(2) Date: Dec. 9, 2019

(87) PCT Pub. No.: WO2018/229918
PCT Pub. Date: Dec. 20, 2018

(65) Prior Publication Data
US 2020/0172031 A1 Jun. 4, 2020

(51) Int. Cl.
*B60R 16/03* (2006.01)
*H01B 7/08* (2006.01)
(Continued)

(52) U.S. Cl.
CPC .......... *B60R 16/03* (2013.01); *B60R 16/0207* (2013.01); *H01B 7/08* (2013.01);
(Continued)

(58) Field of Classification Search
CPC ........ B60R 16/0207; H01B 7/08; H01B 7/42; H02G 3/16; H02G 3/00; H02G 3/0437;
(Continued)

(56) References Cited

U.S. PATENT DOCUMENTS 6,166,453 A 12/2000 Kon'i et al.
6,252,169 B1 6/2001 Gegusch-Brunner et al.
(Continued)

FOREIGN PATENT DOCUMENTS

| CN | 1113595 | 12/1995 |
|---|---|---|
| CN | 101206288 | 6/2008 |

(Continued)

OTHER PUBLICATIONS

Chinese Office Action, Chinese Patent Office, Application No. 201780092069.3, dated May 6, 2021 (with English translation).
(Continued)

*Primary Examiner* — Timothy J Thompson
*Assistant Examiner* — Michael F Mcallister
(74) *Attorney, Agent, or Firm* — Greenblum & Bernstein, P.L.C.

(57) ABSTRACT

A wiring module includes: a common power supply line whose one end is electrically connected to a power source; and a power supply branch part provided halfway through the common power supply line, wherein the power supply branch part includes at least one group of a power supply
(Continued)

branch line branched halfway through the common power supply line and an overcurrent blocking part provided in the power supply branch line to enter a non-continuity state when current exceeding allowable current flows in the power supply branch line. A wiring module is a wiring module disposed along a fixing target member, and includes: a power supply flat wiring body disposed along a surface of a fixing target member; and a ground flat wiring body disposed along a surface of the power supply flat wiring body on an opposite side from the fixing target member.

12 Claims, 13 Drawing Sheets

(51) Int. Cl.
  *H02G 3/16* (2006.01)
  *H02G 3/00* (2006.01)
  *B60R 16/02* (2006.01)
  *H01B 7/42* (2006.01)
  *H02H 3/087* (2006.01)
  *H02G 3/04* (2006.01)

(52) U.S. Cl.
  CPC .............. *H01B 7/42* (2013.01); *H02G 3/16* (2013.01); *H02H 3/087* (2013.01); *H01R 2201/26* (2013.01); *H02G 3/00* (2013.01); *H02G 3/0437* (2013.01); *H02G 3/0481* (2013.01)

(58) Field of Classification Search
  CPC ... H02G 3/0481; H02H 3/087; H01R 2201/26
  USPC ........................................................ 361/624
  See application file for complete search history.

(56) References Cited

U.S. PATENT DOCUMENTS

| | | | |
|---|---|---|---|
| 6,630,625 | B1 | 10/2003 | Akashi et al. |
| 6,993,417 | B2* | 1/2006 | Osann, Jr. ............ H04L 67/125 702/62 |
| 8,299,818 | B2* | 10/2012 | Ogata ................. H01L 27/0207 326/101 |
| 10,179,557 | B2* | 1/2019 | Tazarine ................. B60L 50/52 |
| 2003/0050737 | A1* | 3/2003 | Osann, Jr. ............ H04L 67/125 700/277 |
| 2003/0071473 | A1* | 4/2003 | Kondo ................. H01R 25/161 296/34 |
| 2005/0252677 | A1 | 11/2005 | Gagne |
| 2006/0187733 | A1* | 8/2006 | Furuta ...................... G11C 5/14 365/226 |
| 2008/0152286 | A1 | 6/2008 | Ueno et al. |
| 2009/0120662 | A1 | 5/2009 | Tanaka |
| 2011/0031809 | A1 | 2/2011 | Yoshida et al. |
| 2011/0193618 | A1* | 8/2011 | Ogata ................... H01L 23/528 327/530 |
| 2011/0248858 | A1* | 10/2011 | Onodi ..................... H02H 7/261 361/114 |
| 2012/0305308 | A1* | 12/2012 | Toyama ............... H02G 3/0481 174/70 R |
| 2013/0269746 | A1* | 10/2013 | Ramsey .................. H02S 40/36 174/84 R |
| 2014/0102783 | A1 | 4/2014 | Nagahashi |
| 2014/0204544 | A1 | 7/2014 | Tanaka et al. |
| 2014/0213117 | A1 | 7/2014 | Trinh et al. |
| 2014/0332267 | A1 | 11/2014 | Tanaka et al. |
| 2015/0203061 | A1 | 7/2015 | Tokumaru et al. |
| 2015/0349471 | A1 | 12/2015 | Maki et al. |
| 2016/0149329 | A1* | 5/2016 | Nakata ..................... H05K 9/00 439/660 |
| 2016/0288739 | A1 | 10/2016 | Takahashi et al. |
| 2017/0004945 | A1* | 1/2017 | Fuessl .................. H01H 85/153 439/660 |
| 2017/0250510 | A1* | 8/2017 | Niedermeier .......... H01R 13/68 |
| 2018/0326931 | A1* | 11/2018 | Naganishi ............. B60R 16/023 |
| 2018/0345886 | A1 | 12/2018 | Tazarine et al. |

FOREIGN PATENT DOCUMENTS

| | | |
|---|---|---|
| CN | 101442158 A | 5/2009 |
| CN | 101651315 | 2/2010 |
| CN | 103688415 A | 3/2014 |
| CN | 203675442 | 6/2014 |
| CN | 104143387 | 11/2014 |
| DE | 197 42 092 | 3/1999 |
| JP | 10-84629 | 3/1998 |
| JP | 2000-269978 | 9/2000 |
| JP | 2000-270474 A | 9/2000 |
| JP | 2002-203431 | 7/2002 |
| JP | 2002-220011 A | 8/2002 |
| JP | 2003-118506 | 4/2003 |
| JP | 2003-306169 | 10/2003 |
| JP | 2006-32042 | 2/2006 |
| JP | 2008-284980 A | 11/2008 |
| JP | 2011-55694 | 3/2011 |
| JP | 2011-165354 | 8/2011 |
| JP | 2012-5186 | 1/2012 |
| JP | 2012-243550 | 12/2012 |
| JP | 2014-180907 A | 9/2014 |
| JP | 2015-122870 | 7/2015 |
| JP | 2015-134544 | 7/2015 |
| JP | 2016-101046 | 5/2016 |
| JP | 2016-123186 | 7/2016 |
| JP | 2016-147558 | 8/2016 |
| JP | 2017-43242 A | 3/2017 |
| JP | 2017-52473 | 3/2017 |
| WO | 2017/076535 | 5/2017 |

OTHER PUBLICATIONS

Indian Office Action, Indian Patent Office, Application No. 201917050438, dated Jul. 17, 2020.
International Search Report issued in International Patent Application No. PCT/JP2017/022055, dated Aug. 22, 2017.
International Preliminary Report on Patentability issued in International Patent Application No. PCT/JP2017/022055, dated Feb. 8, 2019, with English translation.
Japanese Office Action, JPO, Application No. 2020-004801, dated Apr. 6, 2021, English translation.
Chinese Office Action, China Patent Office, in counterpart Chinese Patent Application No. 201780092069.3, issued on May 5, 2022, (with English translation).
Office Action, China Patent Office, in counterpart Chinese Patent Application No. 201780092069.3, dated Aug. 3, 2022 (with English translation).
Office Action, German Patent Office, in counterpart German Patent Application No. 11 2017 007 649.8, dated Jul. 25, 2022 (with English translation).

* cited by examiner

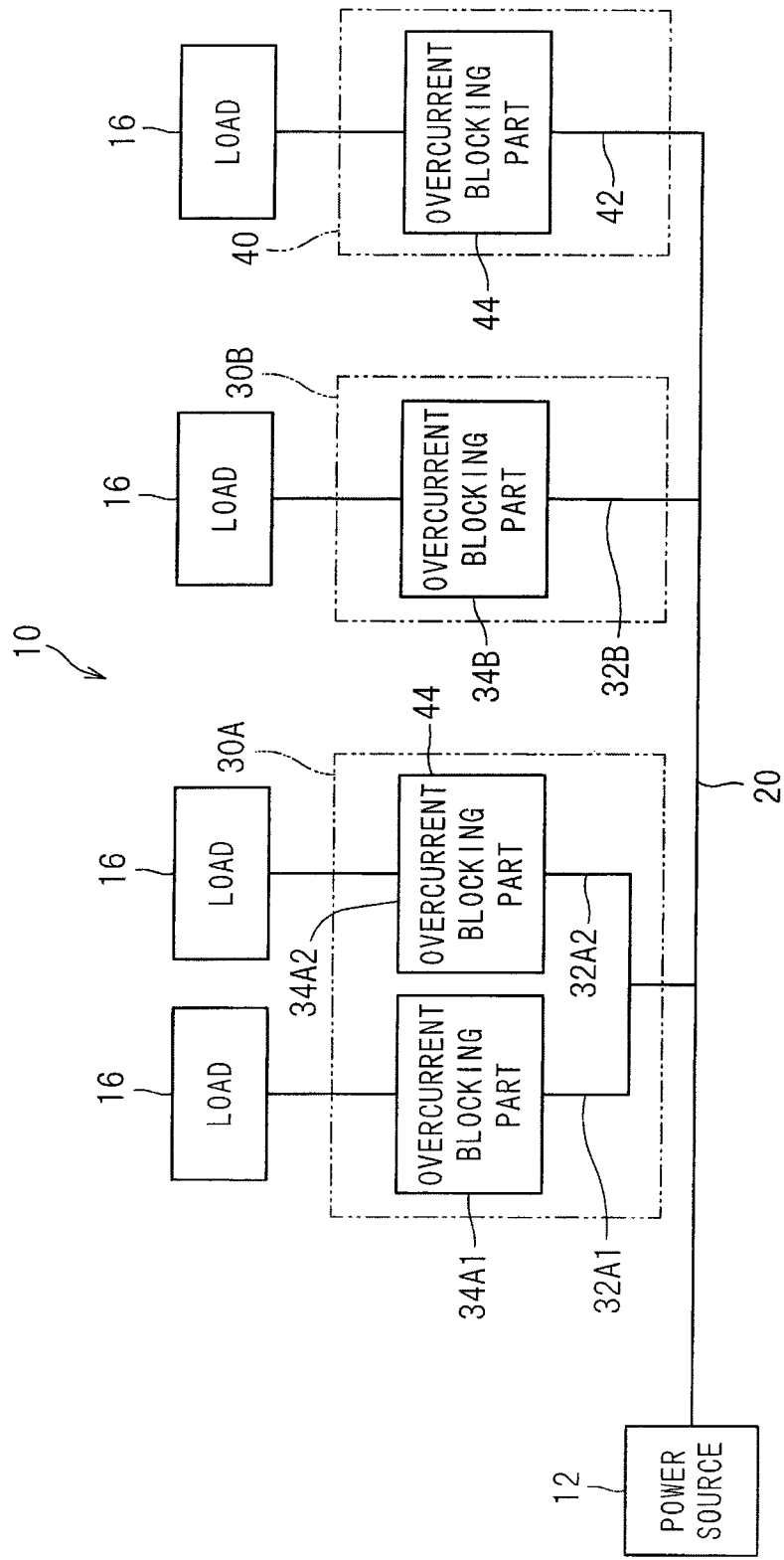
F I G. 1

F I G. 1 7
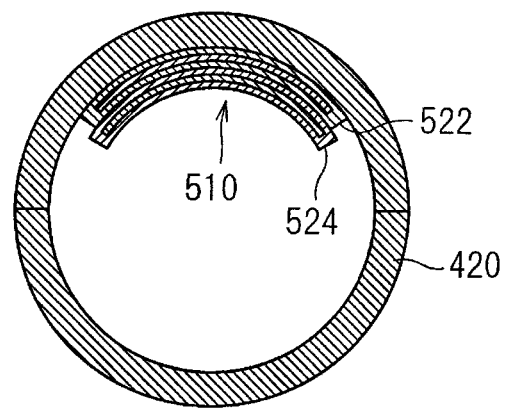
F I G 1 8
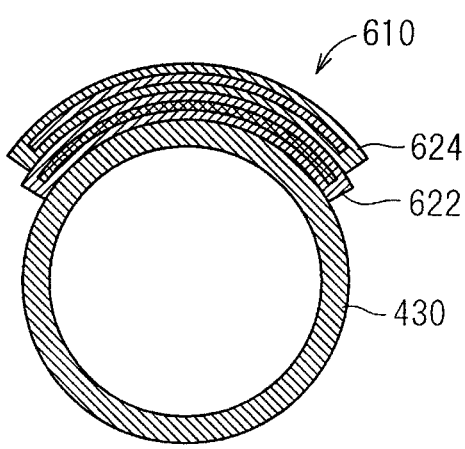

WIRING MODULE INCLUDING A POWER SUPPLY BRANCH PART

TECHNICAL FIELD

The present invention relates to a wiring module including a power supply line.

BACKGROUND ART

An in-vehicle power supply device disclosed in Patent Document 1 includes a plurality of fuses connected in series between a main battery and a load. The plurality of fuses are stored in a fuse box and mounted to a vehicle.

Patent Document 2 discloses that an instrument panel harness is attached along a reinforcement.

PRIOR ART DOCUMENTS

Patent Documents

Patent Document 1: Japanese Patent Application Laid-Open No. 2017-052473
Patent Document 2: Japanese Patent Application Laid-Open No. 2003-118506

SUMMARY

Problem to be Solved by the Invention

However, according to the technique disclosed in Patent Document 1, the plurality of fuses and a plurality of loads corresponding to the plurality of fuses are separately connected by the power supply line. Thus, the plurality of power supply lines need to be wired over a long distance in the vehicle.

According to the technique disclosed in Patent Document 2, when a case where the instrument panel harness includes the power supply line is assumed, there is a problem that heat which has occurred in the power supply line is hardly radiated outside.

Thus, a first problem of the present invention is to reduce a total distance of a power supply line as much as possible. A second problem is to radiate heat which has occurred in a power supply wiring body outside easily.

Means to Solve the Problem

In order to solve the first problem, a wiring module according to a first aspect includes: a common power supply line whose one end is electrically connected to a power source; and a power supply branch part provided halfway through the common power supply line, wherein the power supply branch part includes at least one group of a power supply branch line branched halfway through the common power supply line and an overcurrent blocking part provided in the power supply branch line to enter a non-continuity state when current exceeding allowable current flows in the power supply branch line. Further, the common power supply line includes a plurality of wiring bodies divided by the power supply branch part, and cross-sectional areas of the plurality of wiring bodies serially decrease with increasing distance from the power source. Further, the common power supply line is disposed along the reinforcement while at least part of the common power supply line and at least part of the power supply branch part are housed in the reinforcement.

A second aspect is the wiring module according to the first aspect, wherein the overcurrent blocking part includes a semiconductor switch.

A fourth aspect is the wiring module according to the first or second aspect, wherein an electronic control part is incorporated into the power supply branch part.

A sixth aspect is the wiring module according to the first, second or fourth aspect, wherein the common power supply line includes a flat wiring body disposed along a surface of the reinforcement.

A seventh aspect is the wiring module according to any one of the first, second, fourth and sixth aspects, wherein the power supply branch part includes a connector for connecting the power supply branch line to a load.

A seventh aspect is the wiring module according to any one of the first to sixth aspects, wherein the power supply branch part includes a connector for connecting the power supply branch line to a load.

In order to solve the second problem, an eight aspect is a wiring module disposed along a fixing target member, and includes: a power supply flat wiring body disposed along a surface of a fixing target member; and a ground flat wiring body disposed along a surface of the power supply flat wiring body on an opposite side from the fixing target member.

A ninth aspect is the wiring module according to the eighth aspect, further including a flat wiring body including a plurality of signal lines maintained in a parallel state and provided on an opposite side of the power supply flat wiring body from the fixing target member.

A tenth aspect is the wiring module according to the eighth or ninth aspect, wherein the power supply flat wiring body is disposed along a reinforcement as a fixing target member.

An eleventh aspect is the wiring module according to the tenth aspect, wherein the power supply flat wiring body and the ground flat wiring body are disposed in a reinforcement.

A twelfth aspect is the wiring module according to the eleventh aspect, wherein the power supply flat wiring body and the ground flat wiring body are disposed in a reinforcement in which a pair of sidewall parts stands on both sides of a bottom part, the power supply flat wiring body being in contact with an inward surface of the bottom part.

A thirteenth aspect is the wiring module according to any one of the first, second, fourth, sixth and seventh aspects, wherein a terminal portion of the common power supply line is connected to a load via a terminal portion power supply junction part.

According to a fourteenth aspect, a wiring module includes: a common power supply line whose one end is electrically connected to a power source; and a power supply branch part provided halfway through the common power supply line, wherein the power supply branch part includes at least one group of a power supply branch line branched halfway through the common power supply line and an overcurrent blocking part provided in the power supply branch line to enter a non-continuity state when current exceeding allowable current flows in the power supply branch line, the common power supply line includes a plurality of wiring bodies divided by the power supply branch part, cross-sectional areas of the plurality of wiring bodies serially decrease with increasing distance from the power source, width dimensions of the plurality of wiring bodies coincide with each other, and thickness dimensions of the plurality of wiring bodies serially decrease with increasing distance from the power source, thus cross-sectional areas of the plurality of wiring bodies serially decrease.

A fifteenth aspect is the wiring module according to the fourteenth aspect, wherein the common power supply line is disposed along the reinforcement while at least part of the common power supply line and at least part of the power supply branch part are housed in the reinforcement, and the width dimensions of the plurality of wiring bodies coincide with a width dimension of a space where the reinforcement houses the plurality of wiring bodies.

According to a sixteenth aspect, a wiring module includes: a common power supply line whose one end is electrically connected to a power source; and a power supply branch part provided halfway through the common power supply line, wherein the power supply branch part includes at least one group of a power supply branch line branched halfway through the common power supply line and an overcurrent blocking part provided in the power supply branch line to enter a non-continuity state when current exceeding allowable current flows in the power supply branch line, the common power supply line includes a plurality of wiring bodies divided by the power supply branch part, cross-sectional areas of the plurality of wiring bodies serially decrease with increasing distance from the power source, the common power supply line is disposed along the reinforcement while at least part of the common power supply line and at least part of the power supply branch part are housed in the reinforcement, the power supply branch part includes a connector for connecting the power supply branch line to a load, the power supply branch part is provided halfway through the plurality of wiring bodies which linearly extend, and at least part of the common power supply line and at least part of the power supply branch part are housed in a reinforcement while the connector is exposed outside the reinforcement.

A seventeenth aspect is the wiring module according to any one of the eighth to twelfth aspects, wherein the power supply flat wiring body has a surface contact along a surface of the fixing target member.

Effects of the Invention

According to the first, second, fourth, sixth, seventh and thirteenth to sixteenth aspects, the power supply branch part is provided halfway through the common power supply line. The common power supply line supplies electrical power to a portion ranging from the power source to the power supply branch part, and also supplies the electrical power to the portion farther from the power source than the power supply branch part. The electrical power is supplied from the common power supply line to each load via the overcurrent blocking part and the power supply branch line in the power supply branch part. The electrical power can be supplied via the common power supply line, and the common power supply line can be branched by the power supply branch part near each load to supply the electrical power, thus a total distance of a power supply line can be reduced as much as possible. Accordingly, the first problem can be solved.

According to the second aspect, the overcurrent blocking part includes the semiconductor switch, thus even when the current exceeding the allowable current flows and the semiconductor switch enters the non-continuity state, the semiconductor switch can easily recover to the continuity state, and a maintenance can be simplified.

According to the first, second, fourth, sixth, seventh and thirteenth to sixteenth aspects, cross-sectional areas of the plurality of wiring bodies serially decrease with increasing distance from the power source, thus weight saving and cost saving can be achieved.

According to the fourth aspect, the electronic control function can be integrated with the power supply branch part.

According to the first aspect, the wiring module can be disposed along the reinforcement as compactly as possible.

According to the sixth aspect, the common power supply line includes a flat wiring body disposed along a surface of the reinforcement, thus heat occurring in the flat wiring body can be easily radiated via the reinforcement.

According to the seventh aspect, the power supply branch part can be easily connected to the load via the connector.

According to the eighth to twelfth and seventeenth aspects, the power supply flat wiring body comes in contact with the fixing target member with a relatively large area. Accordingly, heat occurring in the power supply flat wiring body is easily transmitted to the fixing target member, and heat occurring in the power supply flat wiring body can be easily radiated outside via the fixing target member, thus the second problem can be solved.

According to the ninth aspect, the plurality of signal lines can be compactly disposed in the form of the flat wiring body along the power supply flat wiring body.

According to the tenth aspect, heat occurring in the power supply flat wiring body can be easily radiated outside via the reinforcement.

According to the eleventh aspect, the power supply flat wiring body and the ground flat wiring body can be disposed using the space in the reinforcement efficiently, and heat can be easily radiated outside via the reinforcement.

According to the twelfth aspect, the power supply flat wiring body and the ground flat wiring body can be easily incorporated into the reinforcement.

BRIEF DESCRIPTION OF DRAWINGS

FIG. 1 A block diagram illustrating a wiring module according to a first embodiment.

FIG. 17 A diagram illustrating a fourth modification example of fixing the wiring module to the reinforcement.

FIG. 18 A diagram illustrating a fifth modification example of fixing the wiring module to the reinforcement.

DESCRIPTION OF EMBODIMENT(S)

First Embodiment

Figure 2:
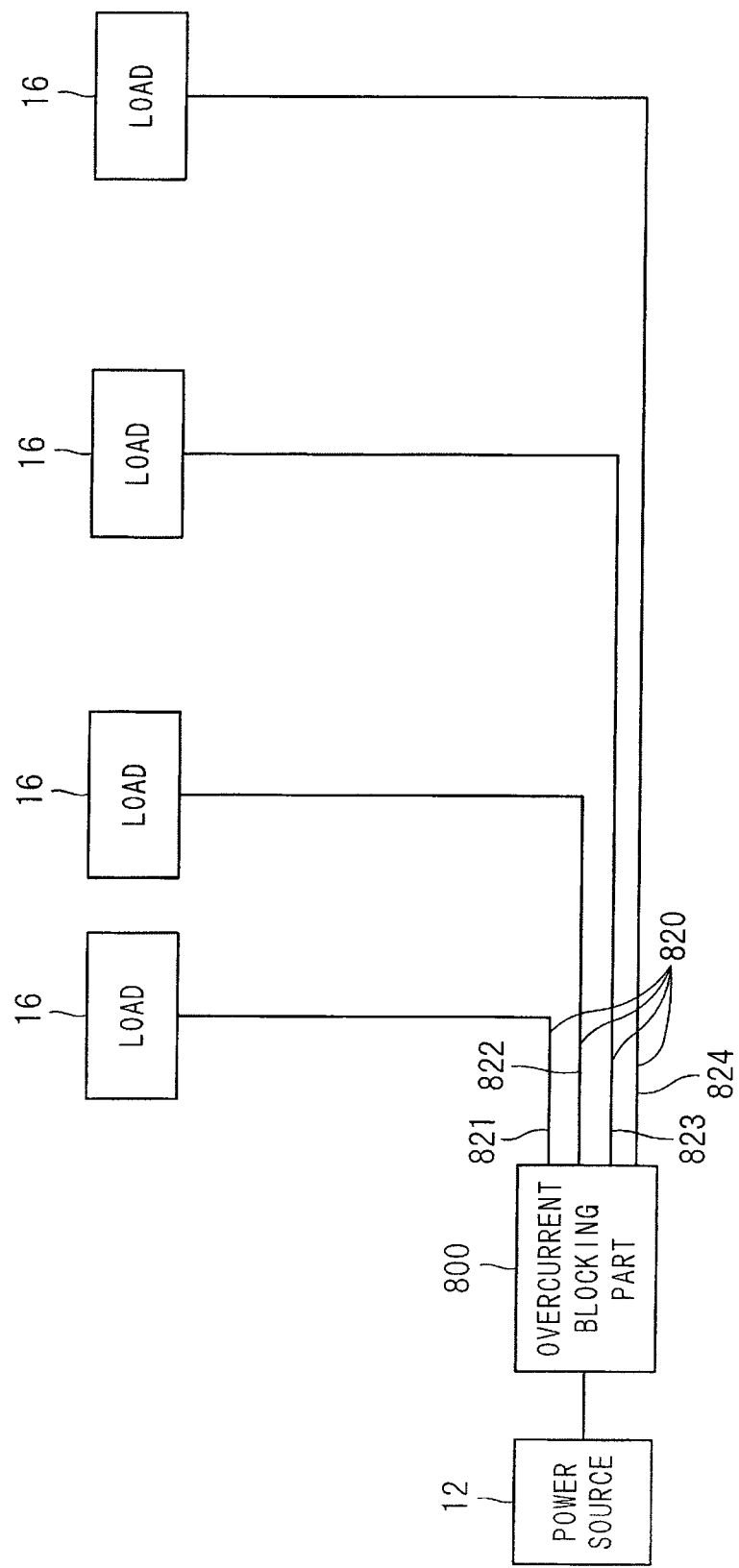
FIG. 2 A block diagram illustrating a comparison example.

A wiring module according to a first embodiment is described hereinafter. FIG. 1 is a block diagram illustrating a wiring module 10 according to the first embodiment.

The wiring module 10 includes a common power supply line 20 and power supply branch parts 30A and 30B. The wiring module 10 is a wiring mounted to a vehicle, for example, to supply electrical power from a power source 12 mounted to the vehicle to a load 16 mounted to the vehicle. The power source 12 is a battery mounted to a vehicle, for example. The load 16 is an electronic control unit (ECU), a motor, a lamp, and a sensor mounted to a vehicle, for example.

The common power supply line 20 is a wiring whose one end is electrically connected to the power source 12. The common power supply line 20 is made up of a general wiring member such as a wiring metal plate, an electrical wire, and a print circuit formed on a substrate, for example, or a combination of these members. The wiring metal plate is made up as a band-like member formed of a metal plate of copper, copper alloy, aluminum, and aluminum alloy, for example. The wiring metal plate is preferably covered by an insulating covering such as a resin. The electrical wire is a member in which an insulating covering such as a resin is formed around a core wire which is formed of copper, copper alloy, aluminum, and aluminum alloy, for example. The print circuit formed on the substrate is a circuit formed of a metal foil such as copper, for example, on a main surface of an insulating substrate such as the resin. When the common power supply line 20 is formed by the combination thereof, each member is connected to each other via a terminal or by soldering or welding, for example.

The plurality of power supply branch parts 30A and 30B are provided halfway through the common power supply line 20. Herein, the power supply branch parts 30A and 30B are provided in this order halfway through the common power supply line 20 in order of increasing distance from the power source 12. A terminal portion power supply intermediate part 40 is provided in a position farthest from the power source 12 in the common power supply line 20.

The power supply branch part 30A includes at least one group of power supply branch lines 31A1 and 32A2 and overcurrent blocking parts 34A1 and 34A2, and includes two groups herein.

The power supply branch line 32A1 is branched halfway through the common power supply line 20. The power supply branch line 32A1 is made up of a general wiring member such as a wiring metal plate, an electrical wire, and a print circuit formed on a substrate, for example, or a combination of these members. The power supply branch line 32A1 is connected to the load 16 directly or via the other wiring member.

The overcurrent blocking part 34A1 is provided in the power supply branch line 32A1, and is configured to enter a non-continuity state when current exceeding allowable current flows in the power supply branch line 32A1. Adoptable as the overcurrent blocking part 34A1 is a configuration including a current monitoring circuit monitoring current flowing in the power supply branch line 32A1, a semiconductor switch interposed in the power supply branch line 32A1, and an electronic control unit performing on-off control of the semiconductor switch based on a detection result of the current monitoring circuit. In this case, the semiconductor switch is in ON state (a continuity state) in a normal state, and when the current flowing in the power supply branch line 32A1 is determined to exceed the preset allowable current in accordance with the detection result of the current monitoring circuit, the semiconductor switch is switched into OFF state, and the semiconductor switch enters the non-continuity state. A relay may be used instead of the semiconductor switch. A general fuse may be used as the overcurrent blocking part 34A1.

The power supply branch line 32A2 is branched halfway through the common power supply line 20 in the same position as the power supply branch line 32A1 described above. The power supply branch line 32A2 has a configuration similar to the power supply branch line 32A1, and the overcurrent blocking part 34A2 provided therein has a configuration similar to the overcurrent blocking part 34A1 described above.

The power supply branch part 30B is provided halfway through the common power supply line 20 in a position farther from the power source 12 than the power supply branch part 30A described above.

The power supply branch part 30B includes at least one group of a power supply branch line 32B and an overcurrent blocking part 34B, and includes one group herein. The power supply branch line 32B has a configuration similar to the power supply branch line 32A1, and the overcurrent blocking part 34B provided therein has a configuration similar to the overcurrent blocking part 34A1 described above.

Needless to say, one power supply branch part is also applicable, and three or more are also applicable.

The terminal portion power supply intermediate part 40 is connected to the common power supply line 20 in a position farther from the power source 12 than the power supply branch parts 30A and 30B.

The terminal portion power supply intermediate part 40 includes at least one group of a terminal portion power supply line 42 and an overcurrent blocking part 44, and includes one group herein. The terminal portion power supply line 42 is connected to a terminal portion of the common power supply line 20, and the overcurrent blocking part 44 provided therein has a configuration similar to the overcurrent blocking part 34A1 described above.

According to the wiring module 10, the power supply branch parts 30A and 30B are provided halfway through the common power supply line 20. The common power supply line 20 supplies electrical power to a portion ranging from the power source 12 to the power supply branch part 30A. Herein, the common power supply line 20 supplies the electrical power to a portion ranging from the power source 12 to the power supply branch part 30A closest to the power source 12. The common power supply line 20 also supplies the electrical power to a portion between the power supply branch parts 30A and 30B. In each of the power supply branch parts 30A and 30B, the electrical power is supplied from the common power supply line 20 to each load 16 via the power supply branch lines 32A1, 32A2, and 32B and the overcurrent blocking parts 34A1, 34A2, and 34B. Achievable is a configuration that the electrical power is supplied via the common power supply line 20 and the common power supply line 20 is branched by the power supply branch parts 30A and 30B near each load 16 to supply the electrical power, thus a total distance of a power supply line can be reduced as much as possible.

FIG. 2 illustrates a case, as a comparison example, where an overcurrent blocking part 800 is provided near the power source 12 and separated power supply lines 820 extending from the overcurrent blocking part 800 to each load 16 are provided. In this case, even when each power supply line 820 extending from the overcurrent blocking part 800 to each load 16 passes through common paths 821, 822, 823, and 824 in a portion near the overcurrent blocking part 800, separated wiring member needs to be used. Thus, a total distance of each power supply line 820 increases.

In contrast, in the embodiment described above, the common power supply line 20 can be adopted to the power supply line extending to each load 16 between the power source 12 and the power supply branch part 30A. The common power supply line 20 can be adopted to the power supply line extending to each load 16 also between the power supply branch part 30A and the power supply branch part 30B. Thus, the total distance of the power supply line can be reduced as much as possible.

Since the power supply lines extending to each load 16 can be put together as the common power supply line 20, the number of wiring members and a cross-sectional area can be reduced, and the power supply wiring can be made thin as a whole.

The configuration including the semiconductor switch is adopted as the overcurrent blocking parts 34A1, 34A2, and 34B, thus even when the current exceeding the allowable current flows and the semiconductor switch enters the non-continuity state, the semiconductor switch can easily recover to the continuity state afterward. Accordingly, an operation of replacing a fuse is not necessary compared with a case of using the fuse as the overcurrent blocking part, for example, thus a maintenance can be simplified.

Second Embodiment

Figure 3:
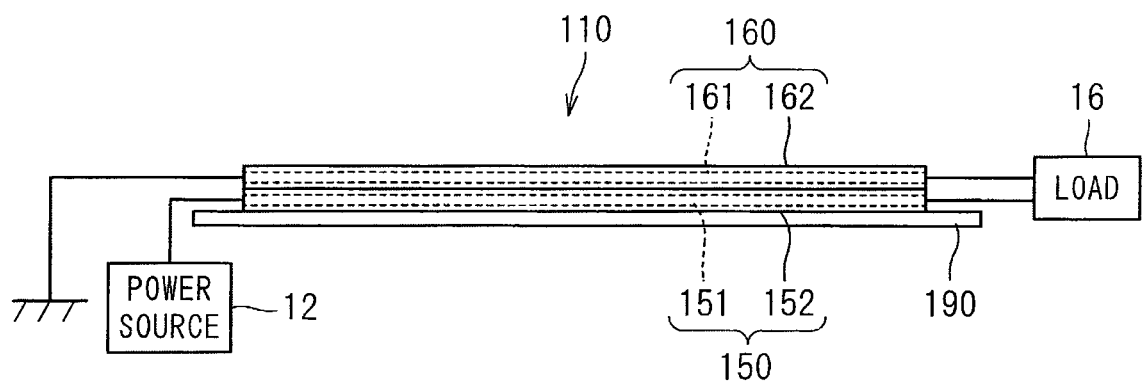
FIG. 3 A schematic view illustrating a wiring module according to a second embodiment.
Figure 4:
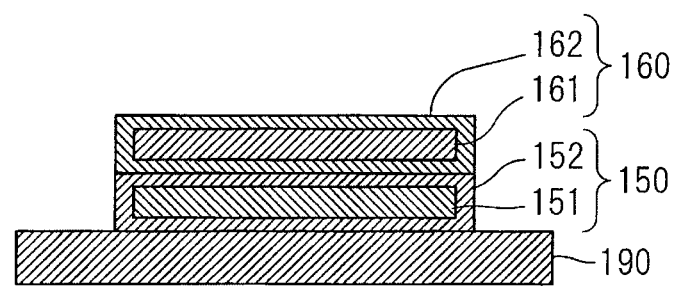
FIG. 4 A schematic cross-sectional view of the wiring module described above.

A wiring module according to a second embodiment is described. FIG. 3 is a schematic view illustrating a wiring module 110 according to the second embodiment, and FIG. 4 is a schematic cross-sectional view of the wiring module 110.

The wiring module 110 is disposed along a surface of a fixing target member 190. The wiring module 110 includes a power supply flat wiring body 150 and a ground flat wiring body 160.

The power supply flat wiring body 150 is disposed along the surface of the fixing target member 190. More specifically, the power supply flat wiring body 150 includes a power supply flat conductor 151 and a covering part 152. The power supply flat conductor 151 is a metal band-like member formed of copper, copper alloy, aluminum, and aluminum alloy, for example. Herein, the power supply flat conductor 151 linearly extends, but may be halfway curved in a width direction or a thickness direction. The covering part 152 is an insulating member formed of resin, for example, and covers a periphery of the power supply flat conductor 151.

The ground flat wiring body 160 is disposed along a surface of the power supply flat wiring body 150 on an opposite side from the fixing target member 190. More specifically, the ground flat wiring body 160 includes a ground flat conductor 161 and a covering part 162. The ground flat conductor 161 is a metal band-like member formed of copper, copper alloy, aluminum, and aluminum alloy, for example. Herein, the ground flat conductor 161 is formed to have the same width dimension and thickness dimension as the power supply flat conductor 151, and has the same cross-sectional area as the power supply flat conductor 151. However, the width dimension and the thickness dimension of the ground flat conductor 161 may be different from those of the power supply flat conductor 151. The covering part 162 is an insulating member formed of resin, for example, and covers a periphery of the ground flat wiring body 160. At least one of the covering part 152 and the covering part 162 described above may be omitted. When both the covering part 152 and the covering part 162 are omitted, for example, it is applicable to make an insulating plate material made of resin intervene between the power supply flat conductor 151 and the ground flat conductor 161 to achieve an insulation therebetween.

The power supply flat wiring body 150 and the ground flat wiring body 160 are combined with each other to be stacked with their extension direction aligned in the same direction. Such an attachment may be maintained by an adhesive tape or an adhesive agent or by being housed in a gutter-like case, for example.

The wiring module 110 may be fixed to the fixing target member 190 by an adhesive tape or an adhesive agent, for example, or also applicable is a configuration that a fixing member fitted into or screwed to the fixing target member 190 presses the wiring module 110 onto the fixing target member 190.

According to the wiring module 110 according to the second embodiment, the power supply flat wiring body 150 comes in contact with the fixing target member 190 with a relatively large area. Thus, heat occurring in the power supply flat wiring body 150 is easily transmitted to the fixing target member 190. Thus, heat occurring in the power supply flat wiring body 150 can be easily radiated outside via the fixing target member 190. Particularly, assumed as the fixing target member 190 is a member such as a metal body of a vehicle and a reinforcement described hereinafter, for example, which relatively extends widely in a vehicle, thus the heat occurring in the power supply flat wiring body 150 can be effectively radiated in the fixing target member 190.

Third Embodiment

Figure 5:
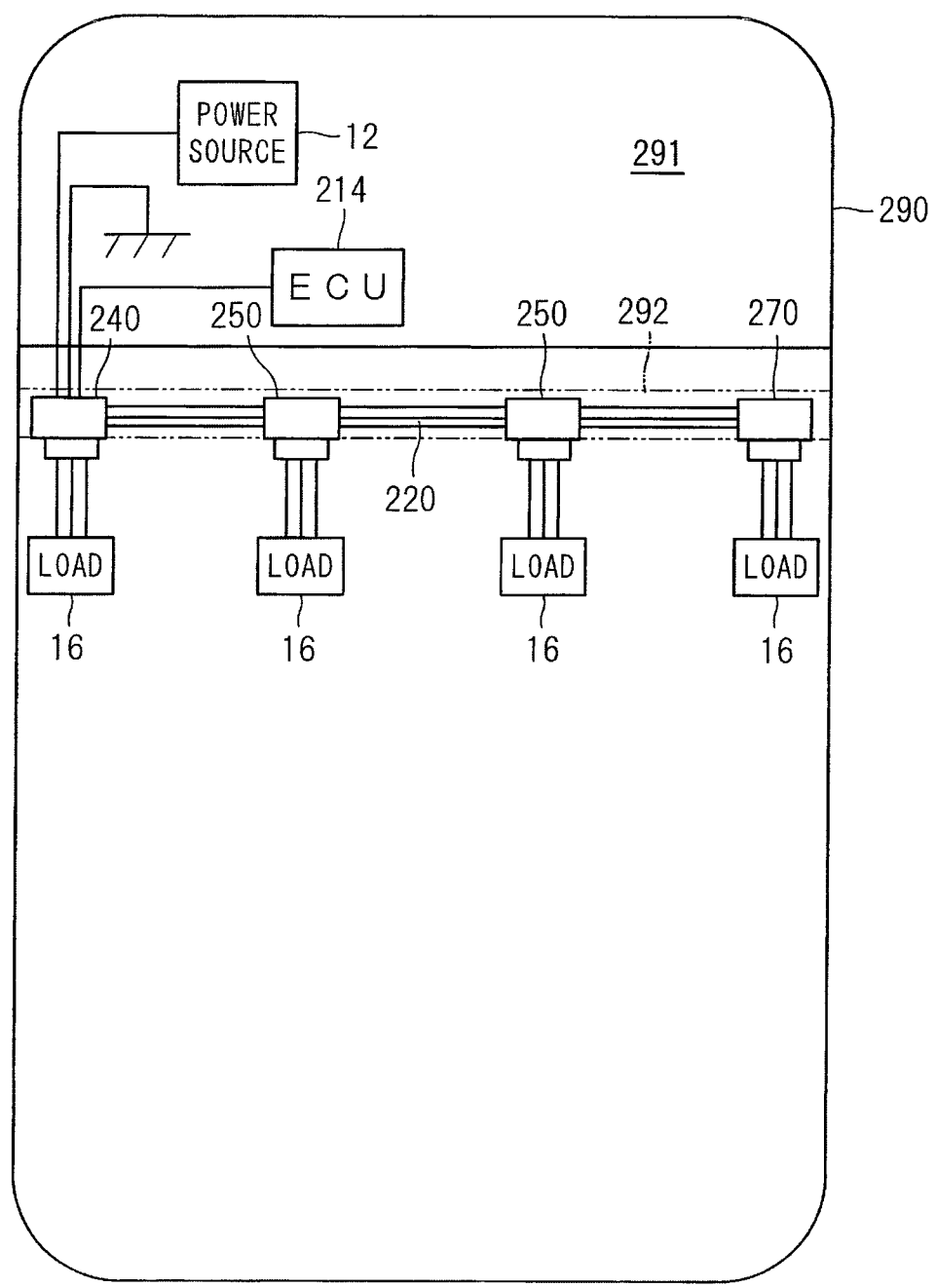
FIG. 5 An explanation view illustrating a wiring module according to a third embodiment incorporated into a vehicle.

A wiring module 210 according to a third embodiment is described. FIG. 5 is an explanation view illustrating the wiring module 210 incorporated into a vehicle 290.

For example, the power source 12 such as a battery is incorporated into an engine room 291 in the vehicle 290. An ECU 214 (electronic control unit) performing an engine control is provided in the engine room 291. A grounding position using a ground terminal such as a round terminal is provided in the engine room 291. The power source 12, the ECU 214, and the grounding position may be located in a position other than the engine room 291.

A power supply line 211a connected to the power source 12, a ground line 211b which is grounded, and a signal line 211c connected to the ECU 214, for example, are wired toward a reinforcement 292. The reinforcement 292 is a reinforcement member provided in an inner portion of an installment panel, for example, and is formed into an elongated shape extending along a vehicle width direction. The power supply line 211a, the ground line 211b, and the signal line 211c are wired toward one end portion of the reinforcement 292.

The wiring module 210 is a wiring member disposed along the reinforcement 292 described above. The wiring module 210 is a wiring member connecting the power supply line 211a, the ground line 211b, and the signal line 211c to each load 16 located along the reinforcement 292. In the example illustrated in FIG. 5, the loads 16 are provided on both end portions of the reinforcement 292, and at least one load 16 (the two loads 16 herein) is provided in a middle portion of the reinforcement 292 in an extension direction. The power supply line 211a, the ground line 211b, and the signal line 211c are branched in a power source side branch box 240 and connected to the load 16, branched in a middle branch box 250 and connected to the load 16, and connected to the load 16 via a terminal portion box 270.

The power supply line 211a, the ground line 211b, and the signal line 211c are connected to each wiring in the wiring module 210 on one end portion of the reinforcement 292. Each wiring in the wiring module 210 may be integrally and sequentially formed with the power supply line 211a, the ground line 211b, or the signal line 211c. Alternatively, each wiring in the wiring module 210 may be connected to the power supply line 211a, the ground line 211b, or the signal line 211c via a connector, for example.

Figure 6:
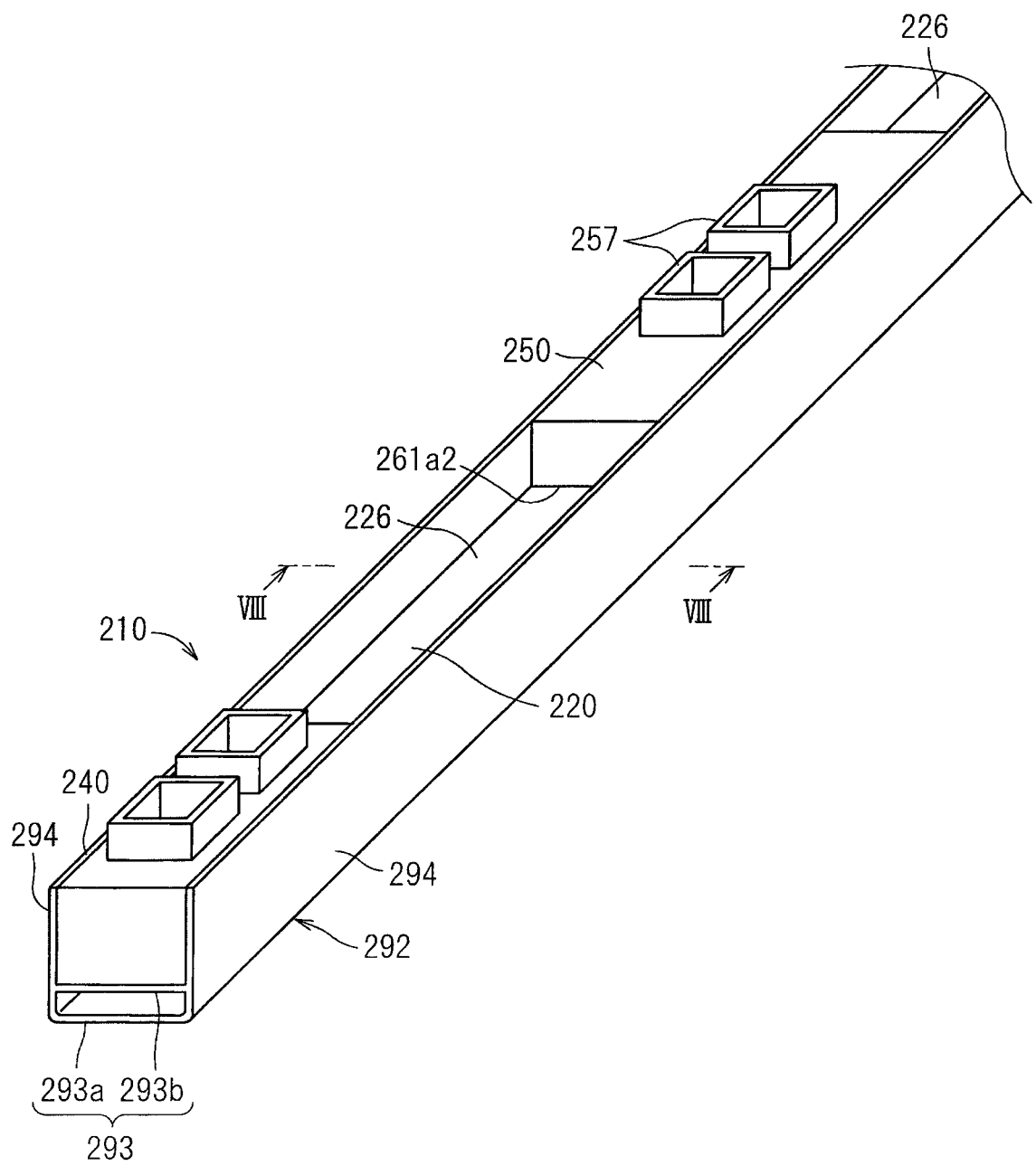
FIG. 6 A schematic perspective view illustrating a wiring module incorporated into a reinforcement.
Figure 7:
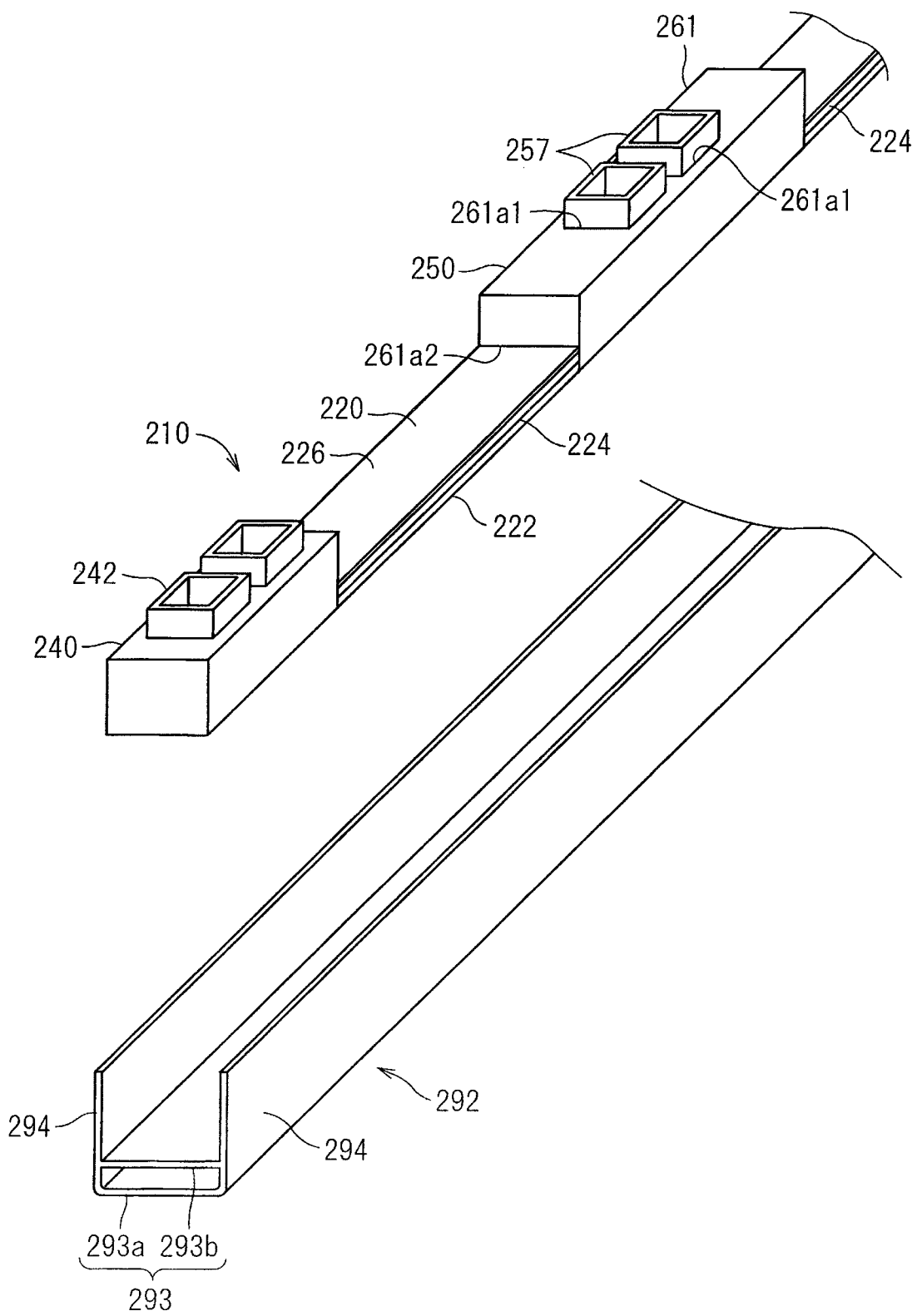
FIG. 7 A schematic perspective view illustrating a wiring module before being incorporated into the reinforcement.
Figure 8:
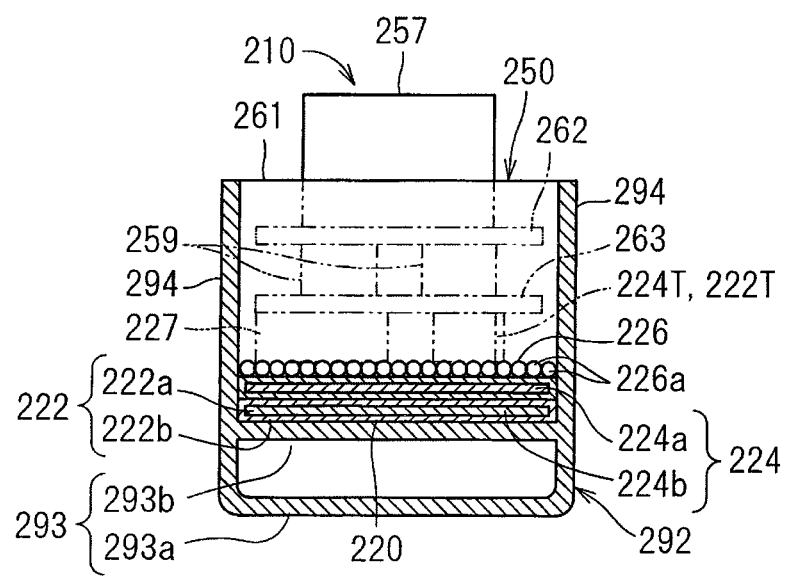
FIG. 8 A schematic cross-sectional view along an VII-VII line in FIG. 6.

FIG. 6 is a schematic perspective view illustrating the wiring module 210 incorporated into the reinforcement 292, FIG. 7 is a schematic perspective view illustrating the wiring module 210 before being incorporated into the reinforcement 292, and FIG. 8 is a schematic cross-sectional view along an VII-VII line in FIG. 6.

The wiring module 210 is incorporated into the reinforcement 292.

Herein, the reinforcement 292 is a member formed of metal, for example, and formed into an elongated shape. The both end portions of the reinforcement 292 is fixed to a metal body in a vehicle by welding or using a screw, for example.

The reinforcement 292 includes a bottom part 293 and a pair of sidewall parts 294.

The bottom part 293 is formed into an elongated plate-like shape. Herein, the bottom part 293 includes an outer plate 293a and an inner plate 293b, thereby having a double structure with a space between the outer plate 293a and the inner plate 293b. The bottom part may be made up of one piece of elongated plate.

The pair of sidewall parts 294 is formed into an elongated plate-like shape, and stands on one main surface of the bottom part 293 and extends from both sides of the bottom part 293. Accordingly, an elongated space capable of housing the wiring module 210 is formed between the bottom part 293 and the pair of sidewall parts 294.

The wiring module 210 includes a wiring part 220 and at least one middle branch box 250. FIG. 6 and FIG. 7 illustrate an example of the power source side branch box 240 and one middle branch box 250.

The wiring part 220 is a member for a wiring connecting the power source side branch box 240, at least one middle branch box 250, and the terminal portion box 270.

The wiring part 220 is disposed along the reinforcement 292 which is the fixing target member, and includes a power supply flat wiring body 222, a ground flat wiring body 224, and a signal wiring body 226.

The power supply flat wiring body 222 is disposed along a surface of the reinforcement 292. Herein, the power supply flat wiring body 222 includes a power supply flat conductor 222a and a covering part 222b formed on a periphery of the power supply flat conductor 222a in the manner similar to the power supply flat wiring body 150 described in the above second embodiment. The power supply flat wiring body 222 is disposed in the reinforcement 292 with one main surface thereof being in contact with an inward surface of the inner plate 293b of the bottom part 293.

The ground flat wiring body 224 includes a ground flat conductor 224a and a covering part 224b formed on a periphery of the ground flat conductor 224a in the manner similar to the ground flat conductor 160 described in the second embodiment. The ground flat wiring body 224 is disposed in the reinforcement 292 in a state of being stacked on the power supply flat wiring body 222 along a surface of the power supply flat wiring body 222 on an opposite side from the bottom part 293 described above.

Thus, the power supply flat wiring body 222 and the ground flat wiring body 224 are relatively compactly housed in the reinforcement 292, using the space in the reinforcement 292. When the heat occurs in the power supply flat wiring body 222, the heat is efficiently transmitted to the bottom part 293 of the reinforcement 292 in planar contact with the power supply flat wiring body 222, and is radiated outside from the whole surface of the reinforcement 292.

The signal wiring body 226 is a flat wiring body in which a plurality of signal lines 226a are maintained in a parallel state. More specifically, adoptable as the signal wiring body 226 is a configuration that a covered electrical wire is used as the signal line 226a and the plurality of signal lines 226a which are parallelly arranged are sandwiched between a pair of resin films. The state where the pair of resin films sandwiches the signal lines 226a may be maintained by an adhesive agent or welding such as ultrasonic welding. Adoptable as the signal wiring body 226 are the other configurations that a plurality of bare core wires parallelly disposed with a space therebetween are sandwiched between a pair of resin films, signal lines parallelly disposed are formed by a metal foil such as a copper foil on a one main surface of a resin base material, and a softened resin extrusion-covers a periphery of bare core wires parallelly disposed with a space therebetween to form a covering part.

The signal wiring body 226 is provided on the opposite side of the power supply flat wiring body 222 from the reinforcement 292. Herein, the signal wiring body 226 is stacked on the power supply flat wiring body 222 and the ground flat wiring body 224 in a state of being disposed along the surface of the ground flat wiring body 224 on the opposite side from the power, supply flat wiring body 222. The signal wiring body 226 is also housed in the reinforcement 292 in this state.

The power supply flat wiring body 222, the ground flat wiring body 224, and signal wiring body 226 are branched and connected to each load 16 in the power source side branch box 240, the middle branch box 250, and the terminal portion box 270, respectively. In the middle branch box 250, the power supply flat wiring body 222, the ground flat wiring body 224, and the signal wiring body 226 may be formed separately or sequentially. Herein, as described hereinafter, the power supply flat wiring body 222, the ground flat wiring body 224, and the signal wiring body 226 are separated by the middle branch box 250, and are electrically connected to each other via a circuit formed in the middle branch box 250. The signal wiring body 226 are not separated but sequentially formed in the middle branch box 250.

Figure 9:
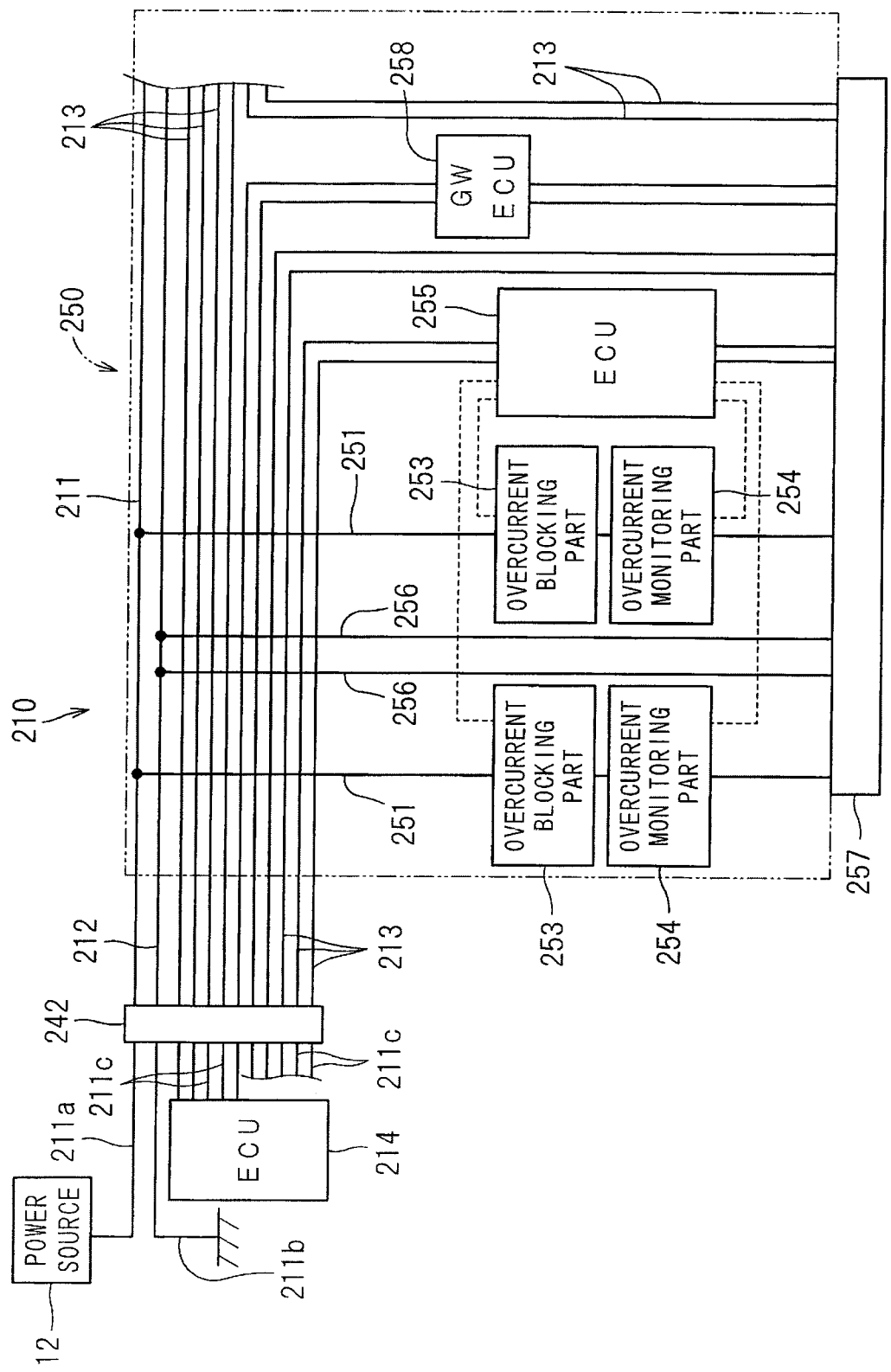
FIG. 9 A circuit diagram according to an example of the wiring module.

FIG. 9 is a circuit diagram according to an example of the wiring module 210. FIG. 9 illustrates a configuration focused on one middle branch box 250, thus the power source side branch box 240, for example, is omitted.

As illustrated in FIG. 9, the wiring module 210 includes the common power supply line 211, a common ground line 212, and a plurality of signal lines 213. A connector 242 is provided in the power source side branch box 240, and the common power supply line 211, the common ground line 212, and the plurality of signal lines 213 are connected to the power source 12, the ECU 214, and a position where the ground is disposed in the other position in the vehicle via the connector 242 and a wire harness connected to the connector 242.

In the middle branch box 250, a power supply branch line 251 is connected halfway through the common power supply line 211 to be branched from the common power supply line 211. The two power supply branch lines 251 are illustrated herein, however, one or three or more power supply branch lines 251 may be also provided.

An overcurrent blocking part 253 is provided in the power supply branch line 251. Herein, the overcurrent blocking part 253 is a semiconductor switch. The overcurrent blocking part 253 may also be a relay or fuse, for example. A current monitoring part 254 is provided in the power supply branch line 251. A known configuration of monitoring current flowing in the power supply branch line 251 can be adopted as the current monitoring part 254. The current detection signal detected by the current monitoring part 254 is supplied to an ECU 255 incorporated into the middle branch box 250. The overcurrent blocking part 253 is in a continuity state as a normal state, and the current for driving the load 16 flows in the power supply branch line 251. The ECU 255 switches the overcurrent blocking part 253 into a non-continuity state based on the detection result in the current monitoring part 254 when determining that the current flowing in the power supply branch line 251 exceeds preset allowable current. Accordingly, the power supply branch line 251 is blocked, and the overcurrent flowing in the power supply branch line 251 is suppressed. When an abnormal state where the overcurrent flows, for example, is resolved, the overcurrent blocking part 253 recovers to the continuity state under control of the ECU 255, and enters a state where the electrical power can be supplied to the load 16. At this time, a maintenance operation such as an operation of replacing a fuse, for example, is not necessary for the middle branch box 250 itself. When the plurality of power supply branch lines 251 are provided, the overcurrent blocking part 253 and the current monitoring part 254 described above are provided in each of the plurality of power supply branch lines 251.

In the middle branch box 250, a ground branch line 256 is connected halfway through the common ground line 212 to be branched from the common ground line 212. The two ground branch lines 256 are illustrated herein, however, one or three or more ground branch lines 256 may be also provided.

The power supply branch line 251 and the ground branch line 256 are connected to a connector terminal provided in a connector 257 in the middle branch box 250. The connector provided on an end portion of the wire harness lead out from the load 16 is connected to the connector 257, thus the electrical power is supplied to the load 16. The connector 257 may be provided in each load 16 or provided in the loads 16 in common. Even in the latter case, the plurality of electrical wires connected to the common connector 257 can be branched halfway through the wire harness to be separately connected to each load 16. FIG. 1 illustrates one connector 257, however, the plurality of connectors may also be provided. FIG. 6 and FIG. 7, for example, illustrate a case where the two connectors 257 are provided.

Some of the plurality of signal lines 213 is connected to the ECU 255 in the middle branch box 250, the other some thereof is connected to a GWECU 258 (gateway ECU), a still other some thereof is connected to the load 16, and a remaining some thereof passes through the middle branch box 250 and is connected to the other middle branch box 250, the terminal portion box 270, and the load 16, for example. There may also be a case where the signal line 213 connected to the load 16 is lead to the middle branch box 250 and is incorporated as a new signal wiring.

The ECU 255 is an electronic control unit performing on-off control of the overcurrent blocking part 253 and control of the load 16 described above, for example, and is incorporated into the middle branch box 250. The ECU 255 is also connected to the load 16 via the other wiring and the connector 257, for example, in some cases.

The GWECU 258 (gateway ECU) is a communication control unit performing a protocol conversion in an in-vehicle communication, for example, and is incorporated into the middle branch box 250. Some of the signal lines 213 is connected to the GWECU 258, and the GWECU 258 is connected to the load 16 via the other wiring and the connector 257, for example.

Some of the plurality of signal lines 213 may directly be connected the terminal of the connector 257 and connected to the load 16.

The ECU 255 and the GWECU 258 described above may be omitted.

The power source side branch box 240 can have a configuration similar to the middle branch box 250 described above except that it includes the connector to be connected to the power source 12, the ECU 214, and the position where the ground is disposed. The terminal portion box 270 can also have a configuration similar to the middle branch box 250 described above except that the power supply line to a downstream side, the ground line, and the signal line are omitted.

Figure 10:
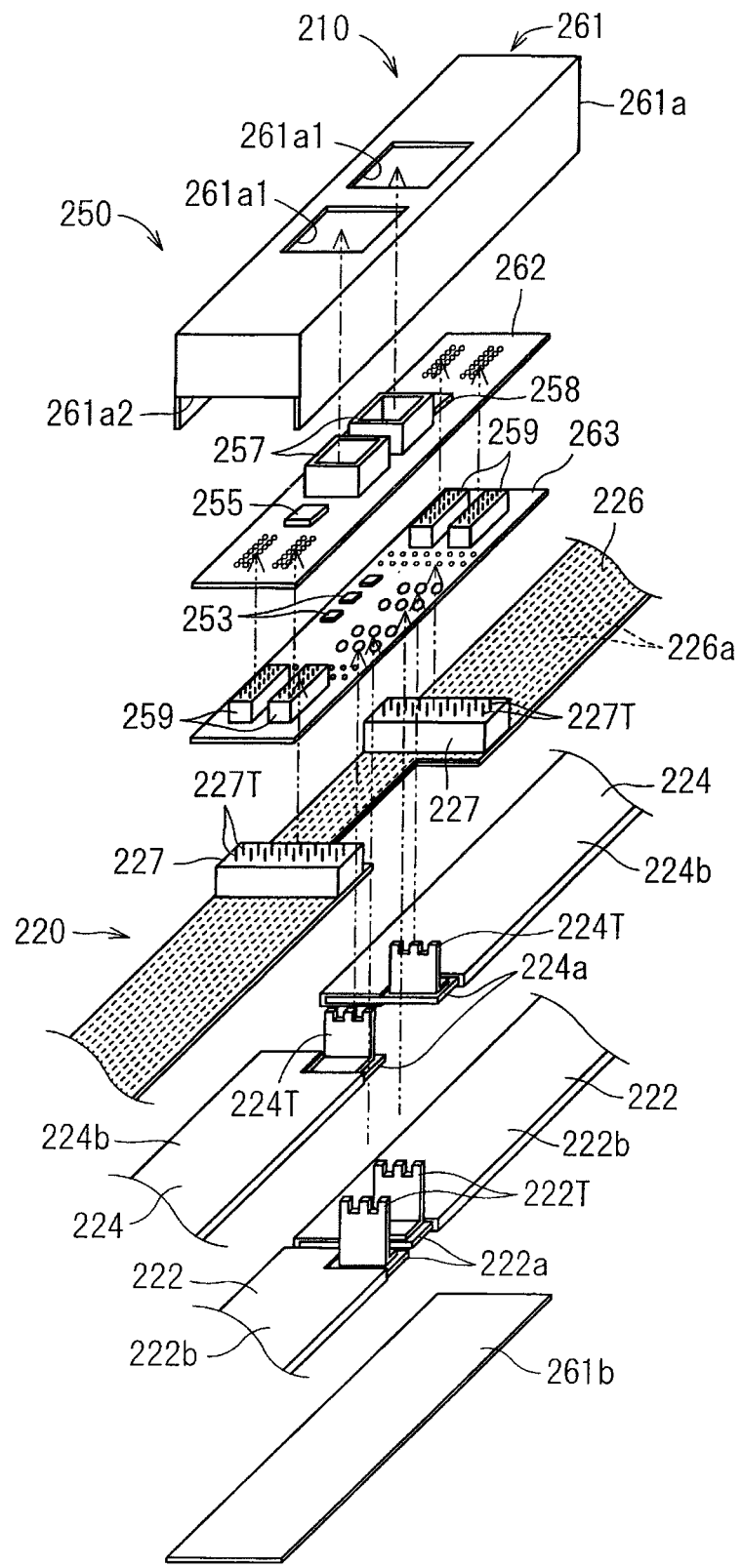
FIG. 10 An exploded perspective view illustrating a configuration example of a middle branch box.
Figure 11:
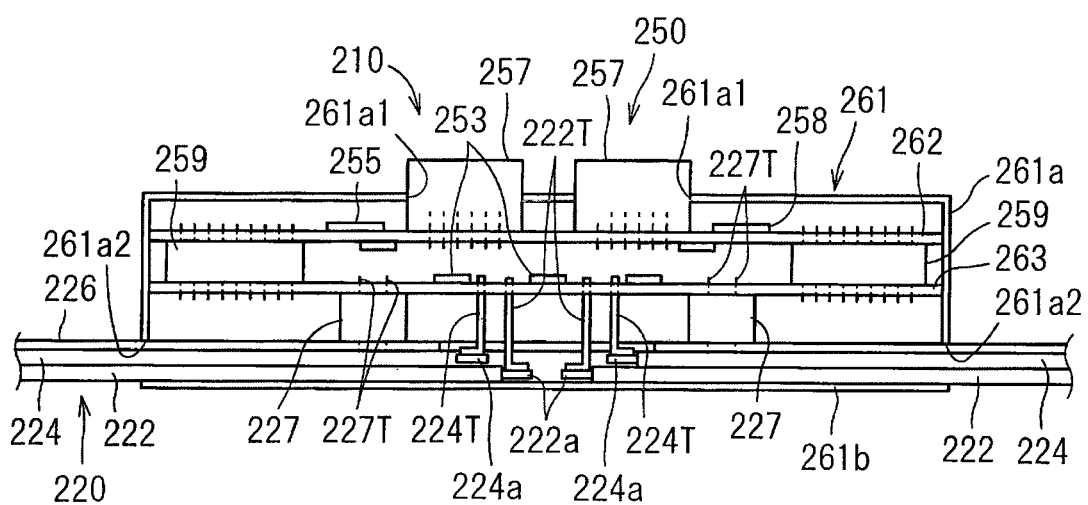
FIG. 11 An explanation view illustrating an example of an internal structure of the middle branch box.

FIG. 10 is an exploded perspective view illustrating a configuration example of the middle branch box 250, and FIG. 11 is an explanation view illustrating an example of an internal structure of the middle branch box 250.

The middle branch box 250 includes a case 261, a first substrate 262, and a second substrate 263.

The case 261 is formed into a chassis made of resin, for example. Herein, the case 261 includes a housing body part 261a and a cover part 261b.

A connector opening 261a1 for exposing the connector outside is formed in the housing body part 261a. A bottom part of the housing body part 261a is opened, and the opening located on an outer side is closed by the cover part 261b. Openings 261a2 are formed in parts of both end portions of the housing body part 261a in an extension direction. The wiring part 220 is lead into the case 261 through the opening 261a2.

The first substrate 262 and the second substrate 263 have a configuration that a predetermined wiring circuit is formed of a metal foil such as a copper foil or a bus bar formed of a metal plate of copper, for example, on a substrate formed of an insulating member of resin, for example. Various mounting components constituting the semiconductor switch which constitutes the overcurrent blocking part 253 described above, the current monitoring part 254, the ECU 255, and GWECU 258, for example, are mounted on the first substrate 262 and the second substrate 263.

The connected 257 is mounted on the first substrate 262. The connector terminal of the connector 257 is electrically and mechanically connected to a circuit formed in the first substrate 262 by soldering or a press-fit structure, for example. A intermediate connector 259 is provided to intervene between the first substrate 262 and the second substrate 263. A intermediate terminal incorporated into the intermediate connector 259 is electrically and mechanically connected to the circuit formed in the first substrate 262 and the second substrate 263 by soldering or a press-fit structure, for example.

The wiring circuit formed in the first substrate 262 and the second substrate 263 forms the power supply line, the ground line, and the signal line in the middle branch box 250 in the electrical circuit illustrated in FIG. 9.

The power supply flat wiring body 222 is separated into one located closer to the power source 12 and one located farther from the power source 12 in the middle branch box 250.

The covering part 222b is partially peeled in an end portion of the power supply flat wiring body 222. Herein, the covering part 222b located close to one side is peeled in the end portion of the power supply flat wiring body 222, and the power supply flat conductor 222a is exposed from the peeled portion. A power supply intermediate terminal 222T is connected to one main surface of the exposed power supply flat conductor 222a, and the power supply intermediate terminal 222T protrudes from one main surface of the power supply flat wiring body 222. Herein, the power supply intermediate terminal 222T is formed into an L-shaped member formed of a metal plate of copper, for example. One end portion of the power supply intermediate terminal 222T is connected to the one main surface of the power supply flat conductor 222a by soldering, for example. A plurality of protrusion parts are formed on the other end portion of the power supply intermediate terminal 222T. The second substrate 263 is disposed on an upper side of the two power supply flat wiring bodies 222 whose end portions face each other, and each protrusion part on the other end portion of the power supply intermediate terminal 222T is inserted into a through hole formed in the second substrate 263 and soldered to the second substrate 263. Accordingly, the power supply flat conductors 222a of the two power supply flat wiring body 222 are electrically connected to the power supply branch line 251 formed in the second substrate 263 or the first substrate 262 via the power supply intermediate terminal 222T. The power supply flat conductors 222a are connected via a circuit for power supply intermediate formed in the second substrate 263 or the first substrate 262. Flat conductors provided on both sides of the middle branch box may be directly joined to each other.

The ground flat wiring body 224 is separated into one located closer to the power source 12 and one located farther from the power source 12 in the middle branch box 250.

The covering part 224b is partially peeled in an end portion of the ground flat wiring body 224. Herein, the covering part 224b located close to one side is peeled in the end portion of the ground flat wiring body 224, and the ground flat conductor 224a is exposed from the peeled portion. A ground intermediate terminal 224T is connected to one main surface of the exposed ground flat conductor 224a, and the ground intermediate terminal 224T protrudes from one main surface of the ground flat wiring body 224. Herein, the ground intermediate terminal 224T is formed into an L-shaped member formed of a metal plate of copper, for example. One end portion of the ground intermediate terminal 224T is connected to the one main surface of the ground flat conductor 224a by soldering, for example. A plurality of protrusion parts are formed on the other end portion of the ground intermediate terminal 224T. The second substrate 263 is disposed on an upper side of the two ground flat wiring bodies 224 whose end portions face each other. A space through which the power supply intermediate terminal 222T described above passes is provided between the end portions of the two ground flat wiring bodies 224. Each protrusion part on the other end portion of the ground intermediate terminal 224T is inserted into a through hole formed in the second substrate 263 and soldered to the second substrate 263. Accordingly, the ground flat conductors 224a of the two ground flat wiring bodies 224 are electrically connected to the ground branch line 256 formed in the second substrate 263 or the first substrate 262 via the ground intermediate terminal 224T. The ground flat conductors 224a are connected via a circuit for ground intermediate formed in the second substrate 263 or the first substrate 262. Needless to say, flat conductors provided on both sides of the middle branch box may be directly joined to each other.

The signal wiring body 226 is a flat wiring body joined at both sides of the middle branch box 250. A partial concave portion 226r is formed in a middle portion of the signal wiring body 226 in an extension direction. Herein, the rectangular concave portion 226r is formed by removing one side portion in the rectangular shape in the middle portion of the signal wiring body 226 in the extension direction. The power supply intermediate terminal 222T and the ground intermediate terminal 224T described above are directed to the second substrate 263 through the concave portion 226r.

A signal intermediate connector 227 is provided on the signal wiring body 226. The signal intermediate connector 227 is formed by incorporating the signal intermediate terminal 227T into a housing formed of resin, for example. The signal intermediate terminal 227T is electrically and mechanically connected to at least one core wire in the plurality of signal lines 226a in the signal wiring body 226 on one end side (a lower side) of the signal intermediate connector 227 by soldering or a press-fit structure, for example. Herein, the signal lines 226a are connected to the signal intermediate terminal 227T on both sides of the concave portion 226r in the signal wiring body 226. The signal intermediate terminal 227T protrudes from the signal intermediate connector 227 on the other end side (an upper side) of the signal intermediate connector 227, and is electrically and mechanically connected to the circuit of the second substrate 263 described above by soldering or a press-fit structure, for example.

The signal line 226a separated by the concave portion 226r can be lead out to a side of the second substrate 263 or the second substrate 263 via the signal intermediate terminal 227T. The signal line 226a which is not separated by the concave portion 226r can go through a lateral portion of the concave portion of the signal wiring body 226 without change. However, also applicable is a configuration that the signal wiring body 226 is separated by the middle branch box 250 and the separated signal lines are connected via the signal intermediate connector, the first substrate, or the second substrate.

In the middle branch box 250, the first substrate 262 and the second substrate 263 stacked into a plurality of layers with a space therebetween via the intermediate connector 259 are housed in an upper space in the case 261. At this time, the connector 257 of the first substrate 262 is exposed outside through the connector opening 261a1. Thus, the connector on a side of the load 16 can be connected to the connector 257. The first substrate 262 and the second substrate 263 are fixed in the case 261 by a screw, a press-fit structure, and an adhesive agent, for example, as necessary.

The power supply flat wiring body 222, the ground flat wiring body 224, and the signal wiring body 226 integral with the second substrate 263 via the power supply intermediate terminal 222T, the ground intermediate terminal 224T, and the signal intermediate connector 227 are housed in a lower space in the case 261. The power supply flat wiring body 222, the ground flat wiring body 224, and the signal wiring body 226 are lead outside through the openings 261a2 on the both sides of the case 261.

In this state, the cover part 261b is attached to the case 261 to close the opening on the lower side of the case 261. The cover part 261b is fixed to the case 261 by a screw, a press-fit structure, and an adhesive agent, for example, as necessary.

The power source side branch box 240 and the terminal portion box 270 can have the configuration similar to the middle branch box 250 described above as long as the wiring part 220 extending from the middle branch box 250 is set in one direction.

In the wiring module 210, at least part of the wiring part 220 and at least part of the middle branch box 250 are housed in the reinforcement 292 while the wiring part 220 is disposed along an inward surface of the bottom part 293 in the reinforcement 292. Herein, the whole of the wiring part 220 is housed in the reinforcement 292, and a part of the middle branch box 250 other than the connector 257 protruding from the case 261 is housed in the reinforcement 292. The wiring module 210 can be fixed to the reinforcement 292 by a double-sided tape and a screw, for example.

According to the wiring module 210 having such a configuration, the power supply branch part including the power supply branch line 251 and the overcurrent blocking part 253 is provided halfway through the common power supply line 211. Thus, the electrical power is supplied to the portion ranging from the power source 12 to the power supply branch part by the power supply flat wiring body 222 which is the part of the common power supply line 211, and the electrical power is also supplied to the portion farther from the power source 12 than the power supply branch part by the power supply flat wiring body 222 which is the part of the common power supply line 211. The electrical power is supplied to the load 16 via the overcurrent blocking part 253 and the power supply branch line 251 in the power supply branch part. The electrical power can be supplied via the common power supply line 211, and the common power supply line 211 can be branched by the power supply branch part near each load 16 to supply the electrical power, thus a total distance of a power supply line can be reduced as much as possible.

Accordingly, as also described in the first embodiment, a cross-sectional area of the power supply flat wiring body 222 can be reduced.

The configuration including the semiconductor switch is adopted as the overcurrent blocking part 253, thus even when the current exceeding the allowable current flows and the semiconductor switch enters the non-continuity state, the semiconductor switch can easily recover to the continuity state afterward. Accordingly, an operation of replacing a fuse is not necessary compared with a case of using the fuse as the overcurrent blocking part, for example, thus a maintenance can be simplified. The overcurrent blocking part 253 can be downsized, and then the middle branch box 250 can be compactified by using the semiconductor switch.

The electronic control part such as the ECU 255 and GWECU 258 are incorporated into the middle branch box 250, thus electronic control functions necessary for the wiring module 210 and the load 16 to be connected, for example, can be divided for each function necessary for the function of the middle branch box 250 or the load connected thereto to integrate the electronic control function with the middle branch box 250. Accordingly, a limitation on a layout of a communication wiring can be reduced, and a communication performance can be improved by reducing a communication distance between devices, for example. The ECU 255 described above has the function of performing the on-off control of the overcurrent blocking part 253 and the function of controlling the load 16 to be connected, thereby enabling the integration of the electronic control function and contributing to power saving and low-fuel consumption.

The power supply flat wiring body 222 is disposed along the reinforcement 292 while at least part of the power supply flat wiring body 222 constituting the common power supply line 211 and at least part of the middle branch box 250 including the power supply branch part are housed in the reinforcement 292, thus wiring module 210 can be disposed along the reinforcement 292 as compactly as possible.

The wiring module 210 includes the power supply flat wiring body 222 disposed along the reinforcement 292 which is a fixing target member, thus the power supply flat wiring body 222 comes in contact with the reinforcement 292 with a relatively large area. Heat occurring in the power supply flat wiring body 222 is easily transmitted to the reinforcement 292, thus the heat occurring in the power supply flat wiring body 222 can be easily radiated outside via the reinforcement 292.

Since the power supply flat wiring body 222 has the flat shape, a space for locating the power supply flat wiring body 222 can be made as small as possible. Since the ground flat wiring body 224 also has the flat shape, a space for locating the ground flat wiring body 224 can also be made as small as possible. Furthermore, the signal wiring body 226 also has the flat shape, thus can be compactly disposed in the form of the flat wiring body along the power supply flat wiring body 222, for example.

The power supply flat wiring body 222 and herein, the ground flat wiring body 224 and furthermore, the signal wiring body 226 are disposed in the reinforcement 292, thus can be disposed using the space in the reinforcement 292 efficiently.

The reinforcement 292 has the configuration that the pair of sidewall parts 294 stands on the both sides of the bottom part 293, thus the power supply flat wiring body 222 and herein, the ground flat wiring body 224 and furthermore, the signal wiring body 226 can be easily incorporated into the reinforcement 292. A width dimension of the power supply flat wiring body 222 preferably coincides with a dimension between the pair of sidewall parts 294 to efficiently use the space in the reinforcement 292, however, this configuration is not necessary. It is also preferable that the ground flat wiring body 224 and the signal wiring body 226 are formed so that a width dimension thereof coincides with the dimension between the pair of sidewall parts 294, however, this configuration is not also necessary.

The power supply branch part includes the connector 257 for connecting the power supply branch line 251 to the load, thus the power supply branch part can be easily connected to the load 16 via the connector 257.

MODIFICATION EXAMPLE

Modification examples are described based on a premise of the embodiments described above.

Figure 12:
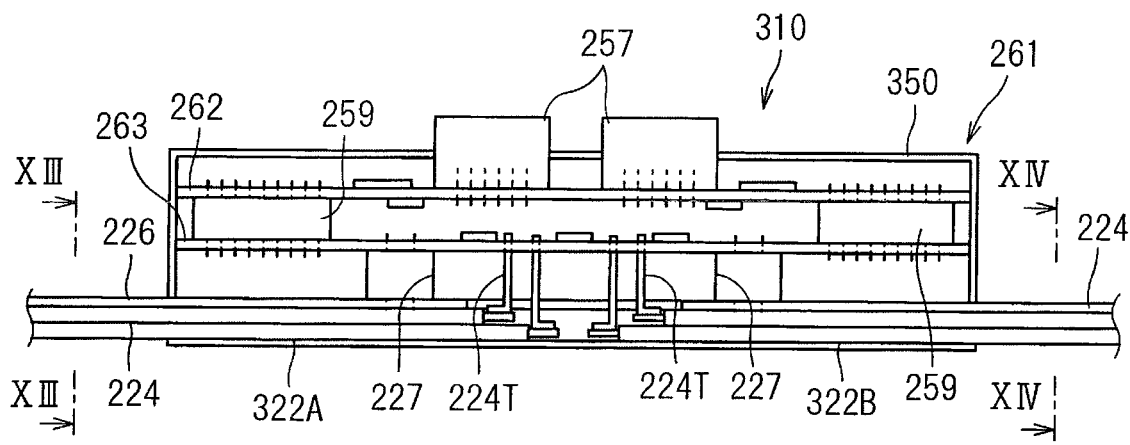
FIG. 12 A schematic view illustrating a first modification example.
Figure 13:
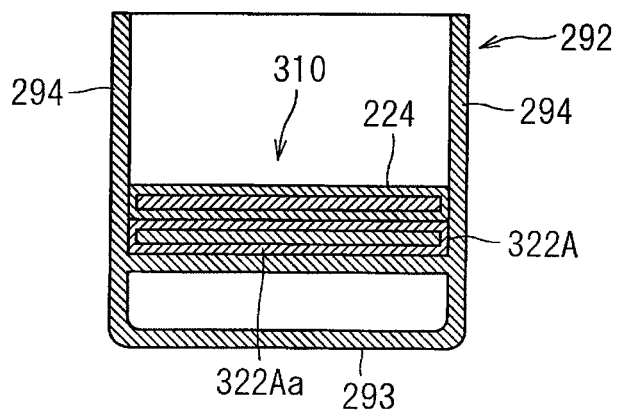
FIG. 13 A cross-sectional view illustrating a state where a cross-sectional part cut along an XIII-XIII line in FIG. 12 is housed in a reinforcement.
Figure 14:
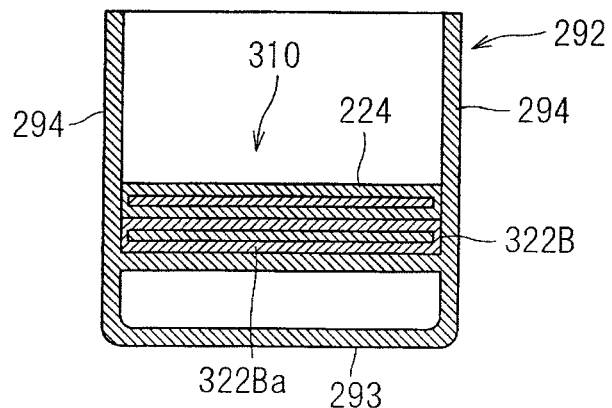
FIG. 14 A cross-sectional view illustrating state where a cross-sectional part cut along an XIV-XIV line in FIG. 12 is housed in the reinforcement.

FIG. 12 is a schematic view illustrating a first modification example based on a premise of the third embodiment. FIG. 13 is a cross-sectional view illustrating a state where a cross-sectional part cut along an XIII-XIII line in FIG. 12 is housed in the reinforcement 292, and FIG. 14 is a cross-sectional view illustrating state where a cross-sectional part cut along an XIV-XIV line in FIG. 12 is housed in the reinforcement 292. The signal wiring body 226 is omitted in FIG. 13 and FIG. 14.

A wiring module 310 is different from the wiring module 210 according to the third embodiment on the following point. That is to say, the wiring module 310 includes a plurality of power supply flat wiring bodies 322A and 322B as a plurality of wiring bodies divided by a middle branch box 350 including the power supply branch part. The power supply flat wiring body 322A is a power supply wiring located closer to the power source and the power supply flat wiring body 322B is a power supply wiring located farther from the power source than the power supply flat wiring body 322A.

Cross-sectional areas of the plurality of power supply flat wiring bodies 322A and 322B serially decrease with increasing distance from the power source. Herein, a thickness dimension of a conductor 322Aa of the power supply flat wiring body 322A is larger than that of a conductor 322Ba of the power supply flat wiring body 322B, and a width dimension of the conductor 322Aa of the power supply flat wiring body 322A and a width dimension of the conductor 322Ba of the power supply flat wiring body 322B are set to be the same as each other.

The common power supply line including the plurality of power supply flat wiring bodies 322A and 322B is branched in the middle branch box 250 and connected to the load 16, thus current flowing in the conductor 322Ba of the power supply flat wiring bodies 322B is smaller than current flowing in the conductor 322Aa of the power supply flat wiring body 322A. Thus, it is possible to relatively increase the cross-sectional area of the conductor 322Aa of the power supply flat wiring body 322A located closer to the power source and in contrast, relatively reduce the cross-sectional area of the conductor 322Ba of the power supply flat wiring body 322B located farther from the power source.

Accordingly, a usage amount of a metal constituting the conductor, for example, can be reduced as the whole wiring module 210, thus weight saving and cost saving can be achieved.

Described in the third embodiment described above is an example of incorporating the wiring module 210 into the reinforcement 292 including the bottom part 293 of double structure and the pair of sidewall parts 294, however, this configuration is not necessary.

Figure 15:
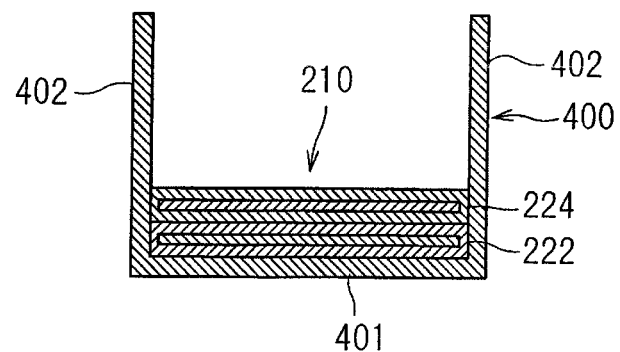
FIG. 15 A diagram illustrating a second modification example of fixing the wiring module to the reinforcement.

For example, as is the case in a second modification example illustrated in FIG. 15, the wiring module 210, particularly the power supply flat wiring body 222 and the ground flat wiring body 224 may be incorporated into a reinforcement 400 with a U-shape in cross section including a bottom part 401 of single structure and a pair of sidewall parts 402.

Figure 16:
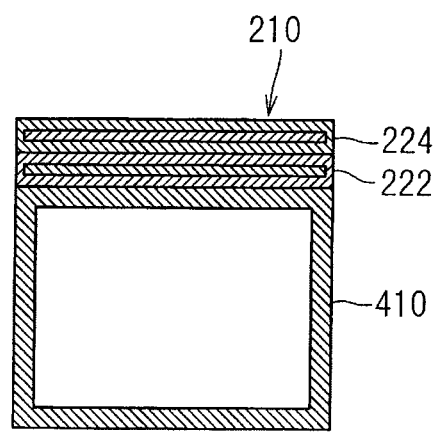
FIG. 16 A diagram illustrating a third modification example of fixing the wiring module to the reinforcement.

As is the case in a third modification example illustrated in FIG. 16, the wiring module 210, particularly the power supply flat wiring body 222 and the ground flat wiring body 224 may be incorporated into an outer surface of a reinforcement 410. In the example illustrated in FIG. 16, the power supply flat wiring body 222 and the ground flat wiring body 224 are incorporated into one outer surface of the reinforcement 410 formed into a rectangular cylindrical shape.

As is the case in a fourth modification example illustrated in FIG. 17 or the case in a fifth modification example illustrated in FIG. 18, the wiring module 210, particularly the power supply flat wiring body 222 and the ground flat wiring body 224 may be incorporated into reinforcements 420 and 430 each formed into a cylindrical shape.

In the fourth modification example illustrated in FIG. 17, a wiring module 510, particularly a power supply flat wiring body 522 and a ground flat wiring body 524 are incorporated into an inner peripheral surface of the reinforcement 420 formed into the cylindrical shape. In the present example, the power supply flat wiring body 522 comes in contact with the inner peripheral surface of the reinforcement 420 with as large a contact area as possible, thus the power supply flat wiring body 522 is formed into a shape curved in an arc in a cross-sectional view orthogonal to an extension direction of the power supply flat wiring body 522. A curvature radius on an outer periphery side of the power supply flat wiring body 522 coincides with a curvature radius of the inner peripheral surface of the reinforcement 420. Herein, the ground flat wiring body 524 also has a cross-sectional shape curved in an arc in the similar manner.

In the fifth modification example illustrated in FIG. 17, the reinforcement 420 has a structure of being divided into two parts along an axial direction thereof so that the power supply flat wiring body 522 and the ground flat wiring body 524 can be easily disposed in the reinforcement 420. The reinforcement 420 having the structure of being divided into two parts may be maintained in an integrated state by welding or a screw, for example, after the wiring module 510 is disposed.

However, such a structure in the reinforcement 420 is not necessary, thus the power supply flat wiring body 522 and the ground flat wiring body 524 may be disposed to pass from an opening in an end portion of the reinforcement 420.

In the present modification example, when a connector which is externally connected (refer to the connector 257 in the third embodiment) is provided, it is preferable that an opening exposing the connector outside is formed in a partial position in an extension direction of the reinforcement 420.

In the example illustrated in FIG. 18, a wiring module 610, particularly a power supply flat wiring body 622 and a ground flat wiring body 624 are incorporated into an outer peripheral surface of the reinforcement 430 formed into the cylindrical shape. In the present example, the power supply flat wiring body 622 comes in contact with the outer peripheral surface of the reinforcement 430 with as large a contact area as possible, thus the power supply flat wiring body 622 is formed into a shape curved in an arc in a cross-sectional view orthogonal to an extension direction of the power supply flat wiring body 622. A curvature radius on an outer periphery side of the power supply flat wiring body 622 coincides with a curvature radius of the outer peripheral surface of the reinforcement 430. Herein, the ground flat wiring body 624 also has a cross-sectional shape curved in an arc in the similar manner.

In the above embodiments and modification examples, each of the power supply flat wiring body, the ground flat wiring body, and the signal wiring body is formed of a single layer, however, at least one of them may be formed of a plurality of layers. For example, when there are power sources each having different voltage, a different power supply flat wiring body may be provided in accordance with each voltage. In this case, at least one power supply flat wiring body should be in planar contact with a fixing target member.

Each configuration described in the above embodiments and modification examples thereof can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10, 110, 210, 310, 510, 610 wiring module
12 electrical wire
16 load
20, 211 common power supply line
30A, 30B power supply branch part
32A1, 32A2, 32B, 251 power supply branch line
34A1, 34A2, 34B, 253 overcurrent blocking part
150, 222, 322A, 522, 622 power supply flat wiring body
151, 222a, 322Aa power supply flat conductor
152, 222b covering part
160, 224, 322B, 524, 624 ground flat wiring body
161, 224a, 322Ba ground flat conductor
162, 224b covering part
190 fixing target member
212 common ground line
213 signal line
220 wiring part
226 signal wiring body
226a signal line
250, 350 middle branch box
254 current monitoring part
255 ECU
256 ground branch line
257 connector
258 GWECU
292, 400, 410, 420, 430 reinforcement
293, 401 bottom part
294, 402 sidewall part

The invention claimed is:

1. A wiring module, comprising:
a common power supply line whose one end is electrically connected to a power source, and the common power supply line supplies power to a plurality of loads; and
a power supply branch part provided halfway through the common power supply line, wherein
the power supply branch part includes at least one group of a power supply branch line branched halfway through the common power supply line and an overcurrent blocking part provided in the power supply branch line to enter a non-continuity state when current exceeding allowable current flows in the power supply branch line, and the overcurrent blocking part is disposed between the common power supply line and only one of the plurality of loads,
the common power supply line includes a plurality of wiring bodies divided by the power supply branch part,
cross-sectional areas of the plurality of wiring bodies serially decrease with increasing distance from the power source, and
the common power supply line is disposed along a reinforcement while at least part of the common power supply line and at least part of the power supply branch part are housed in the reinforcement.

2. The wiring module according to claim 1, wherein the overcurrent blocking part includes a semiconductor switch.

3. The wiring module according to claim 1, wherein an electronic control part is incorporated into the power supply branch part.

4. The wiring module according to claim 1, wherein the common power supply line includes a flat wiring body disposed along a surface of the reinforcement.

5. The wiring module according to claim 1, wherein the power supply branch part includes a connector to connect the power supply branch line to a load among the plurality of loads.

6. The wiring module according to any one of claim 1, wherein
a terminal portion of the common power supply line is connected to a load among the plurality of loads via a terminal portion power supply junction part.

7. A wiring module, comprising:
a common power supply line whose one end is electrically connected to a power source, and the common power supply line supplies power to a plurality of loads; and
a power supply branch part provided halfway through the common power supply line, wherein
the power supply branch part includes at least one group of a power supply branch line branched halfway through the common power supply line and an overcurrent blocking part provided in the power supply branch line to enter a non-continuity state when current exceeding allowable current flows in the power supply branch line, and the overcurrent blocking part is disposed between the common power supply line and only one of the plurality of loads,
the common power supply line includes a plurality of wiring bodies divided by the power supply branch part,
cross-sectional areas of the plurality of wiring bodies serially decrease with increasing distance from the power source, and
width dimensions of the plurality of wiring bodies coincide with each other, and thickness dimensions of the plurality of wiring bodies serially decrease with increasing distance from the power source, thus cross-sectional areas of the plurality of wiring bodies serially decrease.

8. The wiring module according to claim 7, wherein
the common power supply line is disposed along a reinforcement while at least part of the common power supply line and at least part of the power supply branch part are housed in the reinforcement, and
the width dimensions of the plurality of wiring bodies coincide with a width dimension of a space where the reinforcement houses the plurality of wiring bodies.

9. A wiring module, comprising: a common power supply line whose one end is electrically connected to a power source, and the common power supply line supplies power to a plurality of loads; and a power supply branch part provided halfway through the common power supply line, wherein the power supply branch part includes at least one group of a power supply branch line branched halfway through the common power supply line and an overcurrent blocking part provided in the power supply branch line to enter a non-continuity state when current exceeding allowable current flows in the power supply branch line, and the overcurrent blocking part is disposed between the common power supply line and only one of the plurality of loads, the common power supply line includes a plurality of wiring bodies divided by the power supply branch part, cross-sectional areas of the plurality of wiring bodies serially decrease with increasing distance from the power source, the common power supply line is disposed along a reinforcement while at least part of the common power supply line and at least part of the power supply branch part are housed in the reinforcement, the power supply branch part includes a connector to connect for connecting the power supply branch line to a load among the plurality of loads, the power supply branch part is provided halfway through the plurality of wiring bodies, while the connector is exposed outside the reinforcement.

10. The wiring module according to claim 1, wherein the overcurrent blocking part includes a current monitoring circuit to monitor current flowing in the power supply branch line, a semiconductor switch interposed in the power supply branch line, and an electronic controller to control the semiconductor switch based on a detection result of the current monitoring circuit.

11. The wiring module according to claim 1, wherein the overcurrent blocking part includes a relay.

12. The wiring module according to claim 1, wherein the overcurrent blocking part includes a fuse.

\* \* \* \* \*